Figure 1:
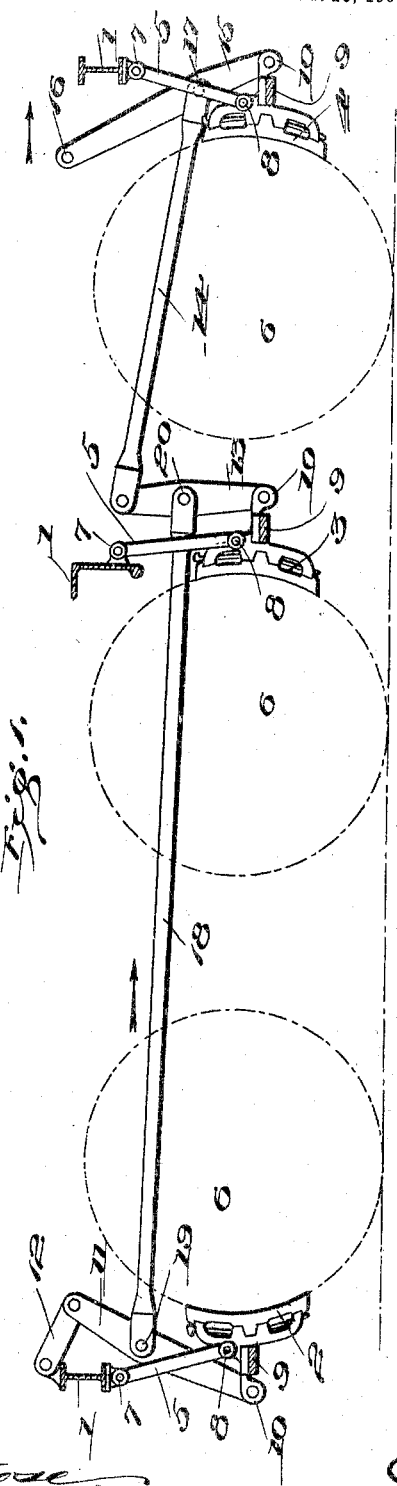

No. 780,276. PATENTED JAN. 17, 1905.
G. L. FOWLER.
BRAKE MECHANISM FOR SIX WHEELED TRUCKS.
APPLICATION FILED APR. 20, 1904.

2 SHEETS—SHEET 1.

Witnesses:
Allan Foose
H. S. Duell

Inventor:
George L. Fowler
by
Duell, McGrath & Warfield
Attorneys.

No. 780,276. PATENTED JAN. 17, 1905.
G. L. FOWLER.
BRAKE MECHANISM FOR SIX WHEELED TRUCKS.
APPLICATION FILED APR. 20, 1904.
2 SHEETS—SHEET 2.
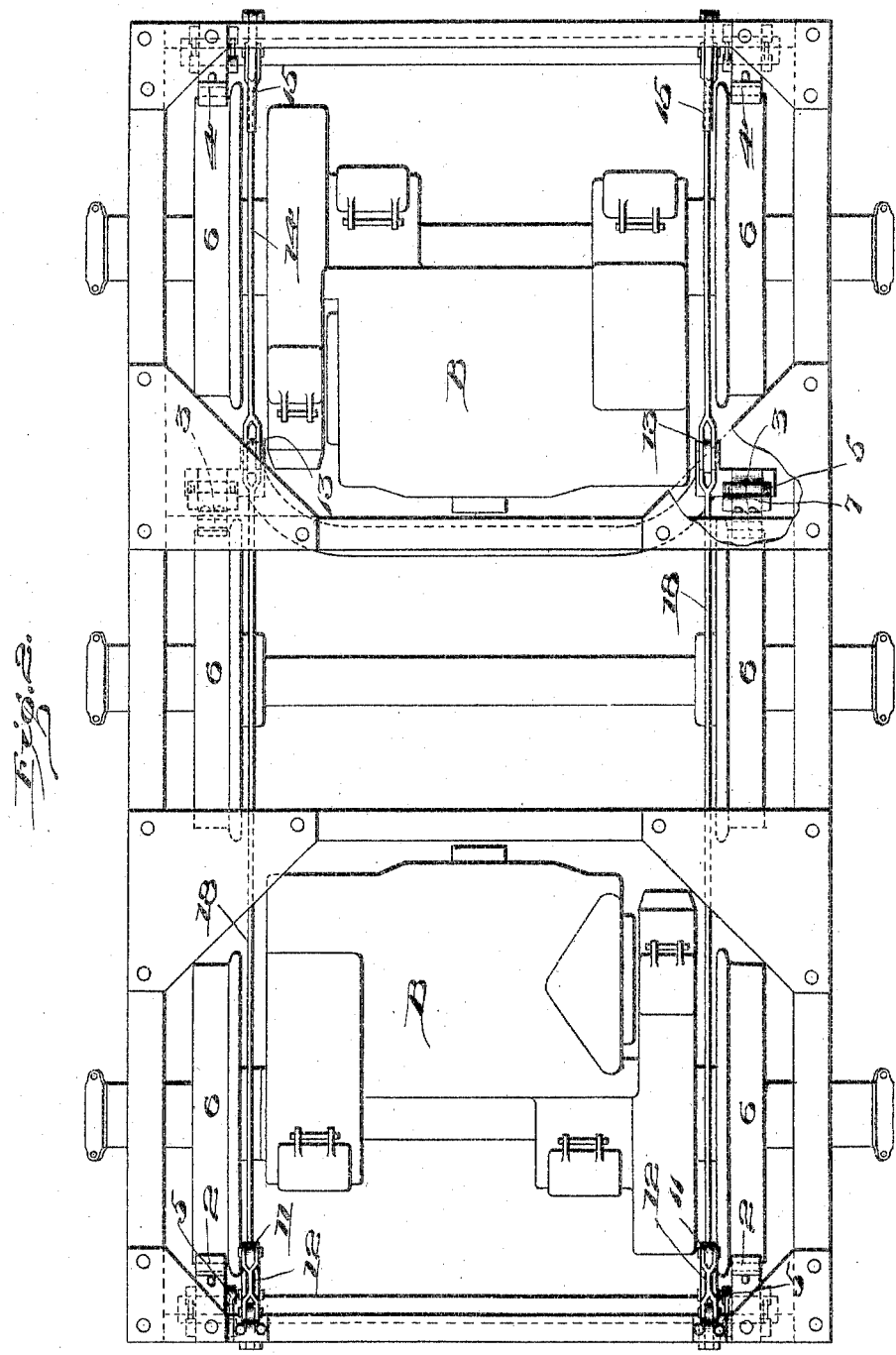
WITNESSES:
INVENTOR.

No. 780,276. Patented January 17, 1905.

UNITED STATES PATENT OFFICE.

GEORGE L. FOWLER, OF NEW YORK, N. Y., ASSIGNOR, BY MESNE ASSIGN-
MENTS, TO THE PECKHAM MANUFACTURING COMPANY, OF KINGSTON,
NEW YORK, A CORPORATION OF NEW YORK.

BRAKE MECHANISM FOR SIX-WHEELED TRUCKS.

SPECIFICATION forming part of Letters Patent No. 780,276, dated January 17, 1905.

Application filed April 20, 1904. Serial No. 203,979.

*To all whom it may concern:*

Be it known that I, GEORGE L. FOWLER, residing at New York, in the county of New York and State of New York, have invented certain new and useful Improvements in Brake Mechanism for Six-Wheeled Trucks, of which the following is a full, clear, and exact description, such as will enable others skilled in the art to which it appertains to make and use the same.

This invention relates to brake mechanism in general and in particular to brakes adapted to be used with six-wheeled car-trucks.

One of its objects is to provide a car-brake in which each shoe engages the corresponding wheel with equal pressure.

Another object is to provide a braking mechanism which shall leave a free space within the truck for the mounting of electric motors.

Other objects will be in part pointed out and in part obvious from the construction hereinafter set forth.

In the accompanying drawings, which show one embodiment of my invention, Figure 1 is a sectional elevation of my improved brake mechanism applied to a six-wheeled truck. Fig. 2 is a plan of the truck.

Similar reference characters are used to denote similar parts throughout both figures.

In the braking mechanisms heretofore used the several brake-shoes, on account of wearing of the face of the shoe or other causes, are applied with an unequal pressure to the corresponding wheels. This, as is well known, will result in the locking of one or more wheels before the others are fully braked, causing the wheel to slide or "skid" on the track. This sliding is extremely objectionable for many reasons, the chief being that the retarding power of the wheel is reduced and the wheel itself seriously injured by reason of having a flat place worn in its outer surface. This is entirely avoided by the peculiar construction embodying my invention.

Among many other advantages of the construction herein shown is the fact that the braking mechanism may be confined to each side of the truck, so as to permit greater space within the same for the mounting of electric motors or for other purposes.

Many other advantages of the application of my invention, such as compactness, reliability, and absence of friction, will be readily apparent to those skilled in the art.

The truck-frame 1 (indicated in cross-section in Fig. 1) supports the brake-shoes 2, 3, and 4 by means of links 5, so as to permit them to swing into contact with the wheels 6. The links 5 are pivoted, as shown, upon perforated lugs 7 formed upon the frame and have a pivotal connection at their lower end with the brake-heads at 8. This connection is preferably located above the connection of the brake-beam 9 with the head, but may obviously be upon any part of the head or the brake-beam itself without altering the operation. Each break-head is provided with a perforated lug 10, adapted to be connected with the corresponding actuating-lever.

The actuating-lever 11 of the shoe 2 is pivotally connected with lug 10 at its lower end, and at its upper end has a swinging connection with the truck-frame 1 through link 12. The actuating-lever 13 of the brake-shoe 3 is connected at its lower extremity with lug 10 and at its upper end is articulated to a link 14, hereinafter more particularly described. The actuating-lever 15 of brake-shoe 4 is connected, as are the two before-mentioned levers, at its lower end to lug 10 of the head of brake-shoe 4 and at its upper end is adapted to be connected to the brake-operating mechanism. This brake-operating mechanism is not shown, as it forms no part of the present invention, and any one of the several types now known may be used in connection with this construction. It is only necessary that a substantially horizontal pressure or tension be applied at the point 16 in the direction indicated by the arrow for applying the brakes and a reverse tension or pressure brought to bear at that point to release the same.

The link 14, hereinbefore referred to, is pivotally connected to actuating-lever 15 at a point 17 intermediate its ends. Link 18 connects actuating-levers 11 and 13 at intermediate points 19 and 20, respectively. An important feature of this embodiment of my invention is that the connecting-points 17, 19, and 20 are so chosen as to proportion the arms of levers 11, 13, and 15 in such a manner that upon a given actuating force being applied at point 16 each of the brake-shoes 2, 3, and 4 will be pressed against its corresponding wheel with an equal force. As will readily be seen, this may easily be accomplished with the construction as herein described, and shown in the accompanying drawings.

It will be understood that the brake mechanism upon both sides of the truck is identical, and for that reason a description of both sides is unnecessary. It will also be seen that the entire braking mechanism with the exception of the beams may be located in planes closely adjacent the planes of the wheels. This arrangement, as shown in Fig. 2, leaves free spaces within the truck-frame entirely unencumbered by the braking mechanism, which are eminently suited for the mounting of electric motors B, or other apparatus of that nature.

The operation of this embodiment of my invention will be obvious from the accompanying drawings. In order to apply the brakes, a pressure or tension is exerted at point 16 in the direction indicated by the arrow. This will tend to move link 14 in a similar direction and force shoe 4, swinging upon link 5, in an opposite direction against the corresponding wheel. The movement of link 14 acting through lever 13 applies brake-shoe 3 to its corresponding wheel in an identical manner and also moves link 18 in the direction indicated by the accompanying arrow. Link 18 being pivoted to lever 11, applied brake-shoe 2 and a free movement of the fulcrum of said lever at 19 is provided for by the swinging of supporting-link 12.

It will thus be seen that I have provided a simple and efficient brake mechanism especially adapted for six-wheel trucks which will apply equal pressure to all the wheels and wherein the center of the truck-frame is free of the brake-rigging.

Obviously in embodying the invention various changes in detail may be made which would differ from the construction shown without departing from the invention.

Having described my invention, what I claim as new, and desire to secure by Letters Patent, is—

1. In a six-wheeled truck, a brake-beam provided with brake-shoes contacting with each set of wheels, a lever pivoted at each end to one of the brake-beams, a link pivotally connected with said lever at an intermediate point, a second lever connected to a second brake-beam at one end and at its other end to a second link and at an intermediate point to said first-mentioned link, and a third lever pivotally connected at one end to a third brake-beam and at its other end adapted to be connected to actuating means and pivotally connected intermediate its length to said second-mentioned link.

2. In a car-brake, a six-wheeled truck, a brake-beam provided with brake-shoes contacting with each set of wheels, a link connected with the truck-frame, a lever pivoted at each end to one of the brake-beams and said link respectively, a link pivotally connected with said lever at an intermediate point, a second lever connected to a second brake-beam at one end and at its other end to a second link and at an intermediate point to said first-mentioned link, and a third lever pivotally connected at one end to a third brake-beam and at its other end adapted to be connected to actuating means and pivotally connected intermediate its length to said second-mentioned link, said levers being so proportioned as to force each brake-beam toward the corresponding wheel with equal pressure.

3. In a car-brake, a six-wheeled truck, brake-beams supported by links from the frame of said truck and provided with brake-shoes contacting with each set of wheels, a lever pivotally connected at one end to one of the brake-beams and at its other end to a link articulated to said truck-frame, a link pivotally connected with said lever at an intermediate point, a second lever connected to a second brake-beam at one end and at its other end to a third link at an intermediate point to said second-mentioned link, and a third lever pivotally connected at one end to a third brake-beam and at its other end adapted to be connected to actuating means and pivotally connected intermediate its length to said third-mentioned link, said levers being so proportioned as to force each brake-beam toward the corresponding wheels with an equal pressure.

4. In a six-wheeled truck, a plurality of wheels, shoes adapted to engage said wheels, levers operatively connected to said shoes, and links connected to said levers at such pivotal points that each shoe will be adapted to engage the corresponding wheel with a substantially equal pressure, said shoes, levers and links lying substantially in a single plane parallel to and closely adjacent the plane of said wheels.

5. In a six-wheeled truck, a plurality of wheels, shoes adapted to engage said wheels, levers operatively connected to said shoes, and links connected to said levers at such pivotal points that each shoe will be adapted to engage the corresponding wheel with a substantially equal pressure, said shoes, levers and links lying substantially in a single vertical plane parallel and closely adjacent the plane of said wheels.

6. In a six-wheeled truck, a plurality of wheels, shoes adapted to engage said wheels, means operatively connected to said shoes, adapted to force each of said shoes against the corresponding wheel with a substantially equal pressure, said shoes and said means lying in a single plane parallel to and closely adjacent the plane of said wheels.

7. In a six-wheeled truck, a plurality of wheels, shoes adapted to engage said wheels, means operatively connected to said shoes, adapted to force each of said shoes against the corresponding wheel with a substantially equal pressure, said shoes and said means lying substantially in a single plane closely adjacent the plane of said wheels.

8. In a six-wheeled truck, a plurality of wheels, shoes adapted to engage said wheels, means operatively connected to said shoes, adapted to force each of said shoes against the corresponding wheel with a substantially equal pressure, said shoes and said means lying substantially in a single vertical plane closely adjacent the plane of said wheels.

9. In a six-wheeled truck, a plurality of wheels, shoes adapted to engage said wheels, means operatively connected to said shoes, adapted to force each of said shoes against the corresponding wheel with a substantially equal pressure, said shoes and said means lying substantially in a single plane parallel to the plane of said wheels.

In testimony whereof I affix my signature in the presence of two witnesses.

GEORGE L. FOWLER.

Witnesses:
F. P. WARFIELD,
H. S. DUELL.